United States Patent
Handlin

(10) Patent No.: US 6,487,838 B2
(45) Date of Patent: Dec. 3, 2002

(54) MOWER AND STRING TRIMMER COMBINATION

(76) Inventor: Terry L. Handlin, 3336 N. Pine Lane St., Terre Haute, IN (US) 47803

( * ) Notice: Subject to any disclaimer, the term of this patent is extended or adjusted under 35 U.S.C. 154(b) by 0 days.

(21) Appl. No.: 09/808,509

(22) Filed: Mar. 14, 2001

(65) Prior Publication Data

US 2002/0129588 A1 Sep. 19, 2002

(51) Int. Cl.[7] .............................................. A01D 34/84
(52) U.S. Cl. .......................................... 56/13.7; 56/12.7
(58) Field of Search ................................ 56/12.7, 16.9, 56/17.5, 13.5, 255, 295, 256; 30/276

(56) References Cited

U.S. PATENT DOCUMENTS

| | | | |
|---|---|---|---|
| 3,824,772 A | * 7/1974 | Sorenson et al. | ................. 56/7 |
| 4,148,174 A | 4/1979 | Mathews et al. | |
| 4,395,865 A | * 8/1983 | Davis, Jr. et al. | ............ 56/13.3 |
| 4,663,920 A | * 5/1987 | Skovhoj | .................... 56/12.7 |
| 4,703,613 A | 11/1987 | Raymond | |
| 4,949,536 A | * 8/1990 | Neufeld | ...................... 56/13.7 |
| 5,065,566 A | 11/1991 | Gates | |
| 5,159,803 A | 11/1992 | Earley, Jr. | |
| 5,167,108 A | * 12/1992 | Bird | ........................... 56/13.7 |
| 5,303,532 A | 4/1994 | Phillips | |
| 5,367,862 A | 11/1994 | Spear et al. | |
| 5,471,824 A | 12/1995 | Neely | |
| 5,970,693 A | 10/1999 | Ciaglo | |
| 6,014,835 A | 1/2000 | Pivonka | |
| 6,056,067 A | 5/2000 | Brown | |

* cited by examiner

*Primary Examiner*—Robert E. Pezzuto
(74) *Attorney, Agent, or Firm*—Woodard, Emhardt, Naughton, Moriarty & McNett

(57) ABSTRACT

A zero turning radius mowing machine has a string trimmer bracket-mounted to it. An extra sheave is mounted to a mower blade shaft above the mower deck, and belt-coupled through an electric clutch to a hydraulic pump mounted on the mower deck. A switch mounted near the operator's seat, is operable to activate the clutch to operate the hydraulic pump and supply hydraulic power to a hydraulic motor coupled to the string trimmer to drive it as the mower is mowing a lawn or the like. The trimmer mounting is adjustable, and the trimmer has a ground-engaging pod causing the trimmer head to float along the ground contour activate and de-activate the pump. Hydraulic oil storage is in a tank serving also as a front bumper and trimmer bracket mount.

57 Claims, 19 Drawing Sheets section 1.2

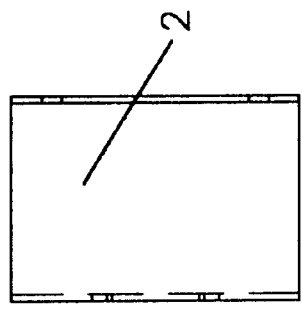
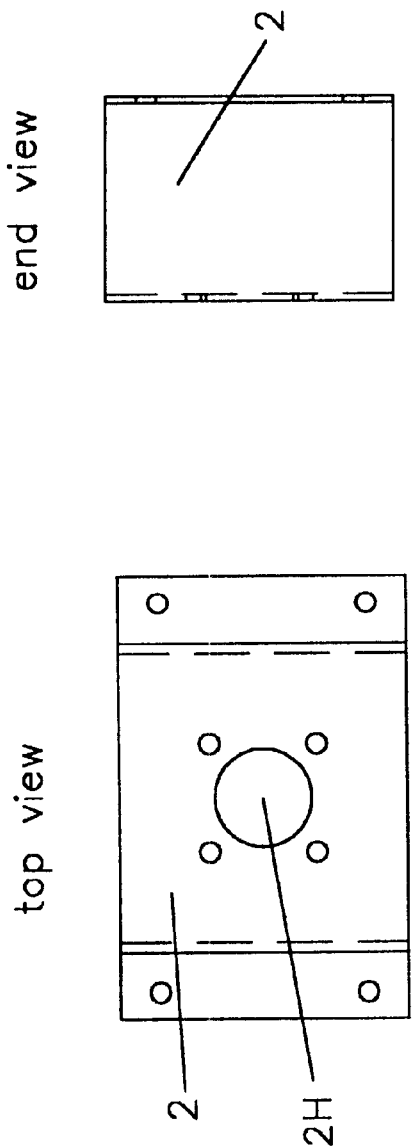
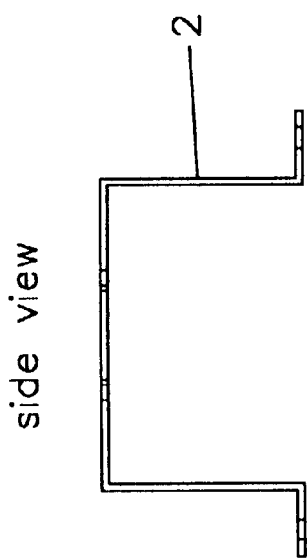
FIG.10C end view
FIG.10B top view
FIG.10A side view

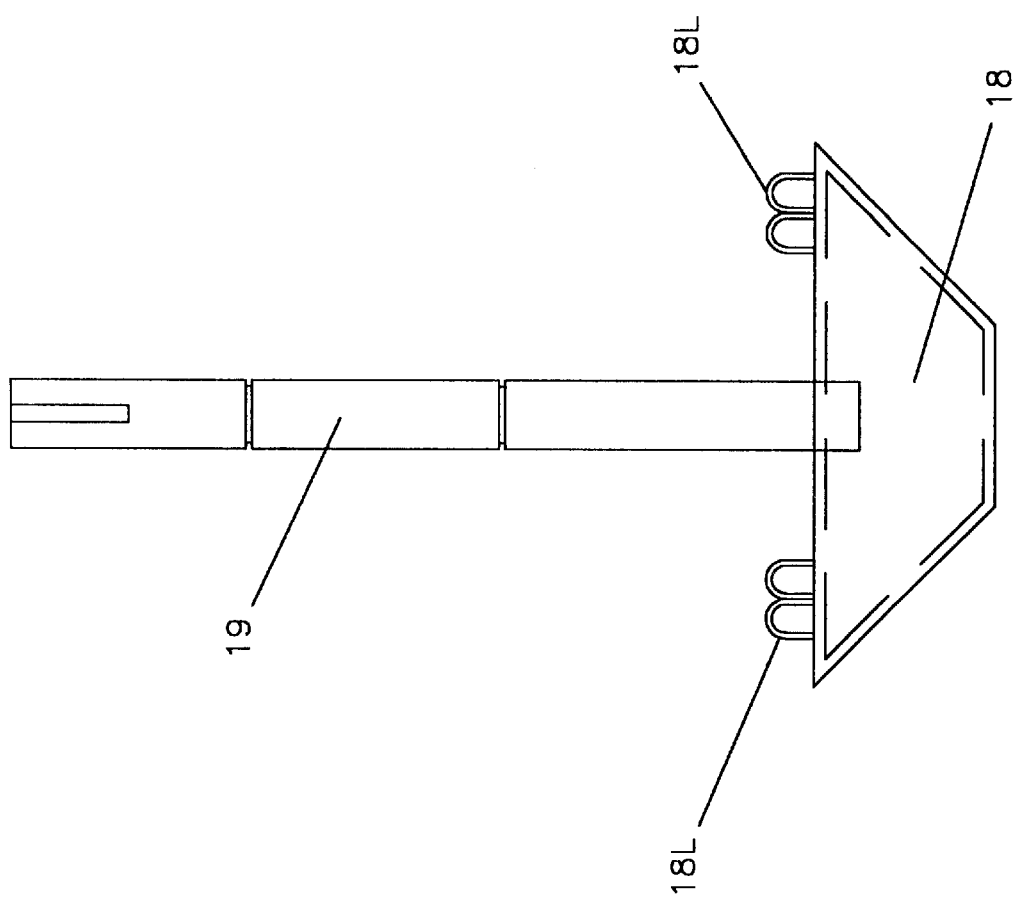

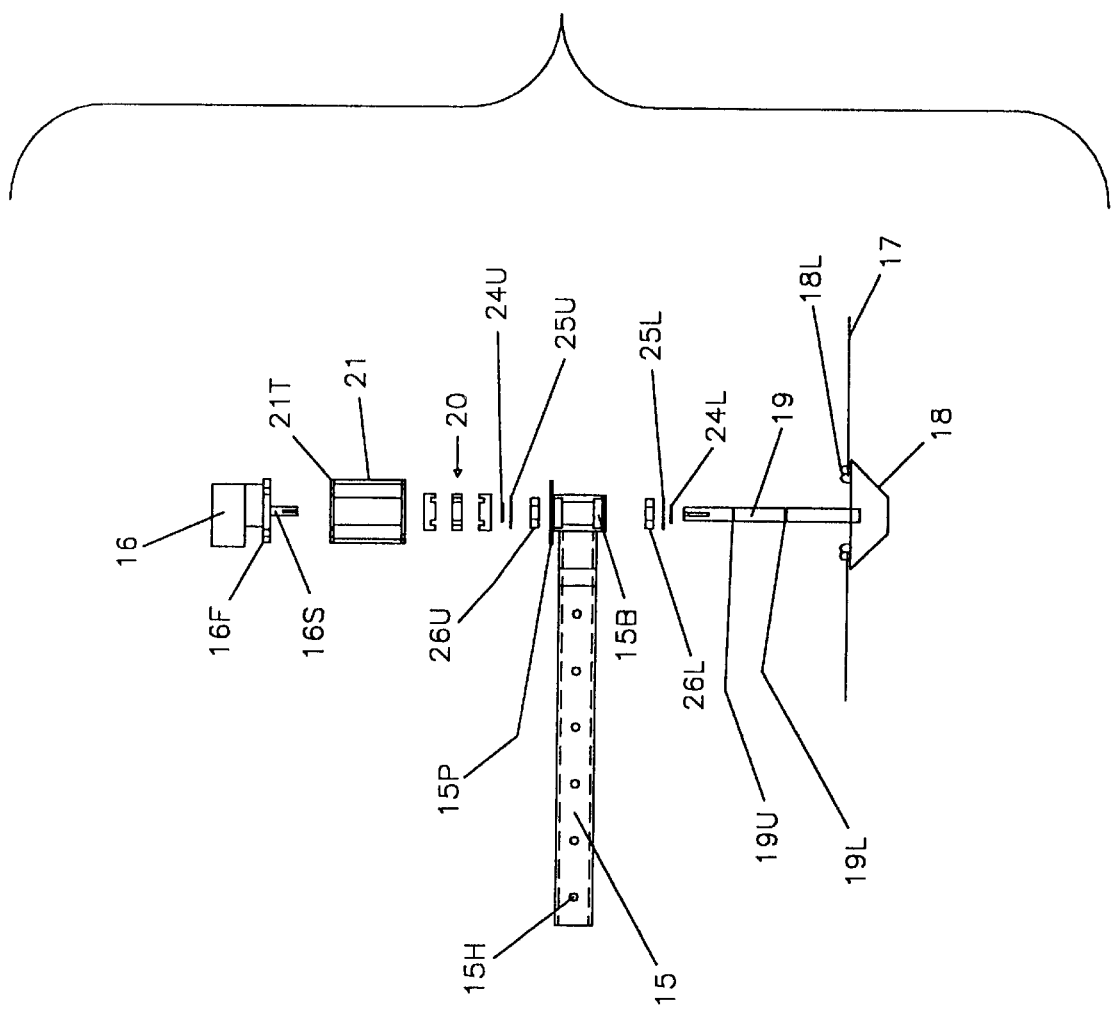

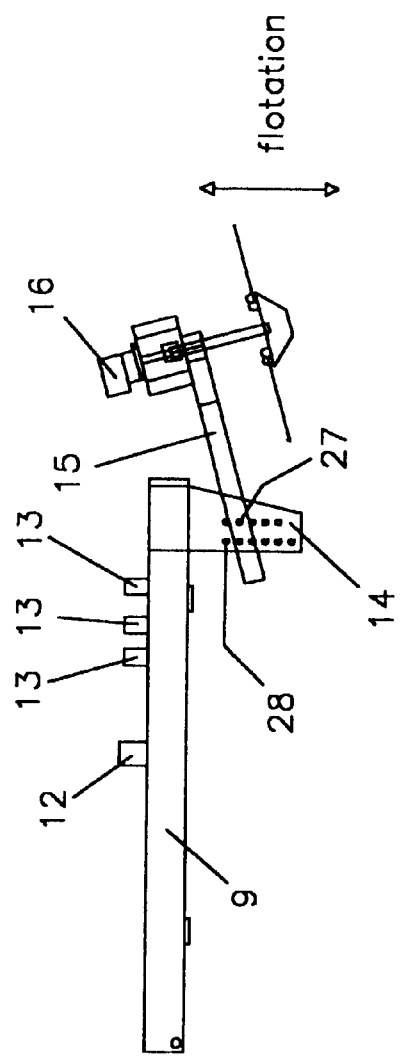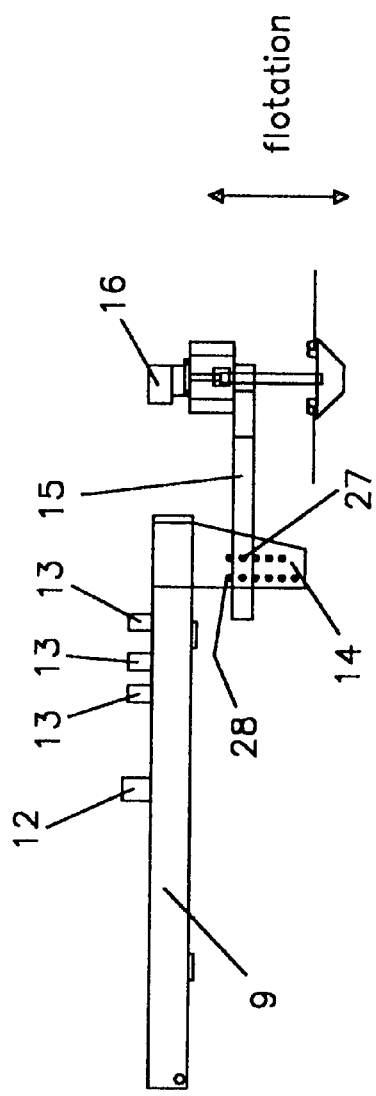
FIG.17B
FIG.17A

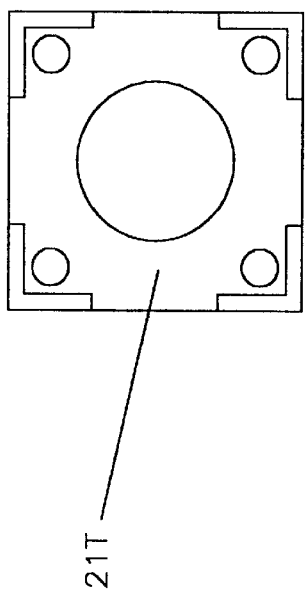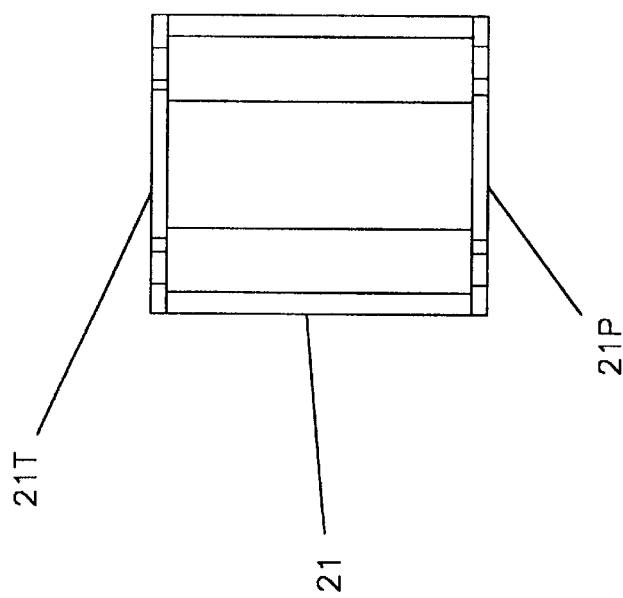

MOWER AND STRING TRIMMER COMBINATION

BACKGROUND OF THE INVENTION

1. Field of the Invention

This invention relates generally to lawn mowing machines, and more particularly to a combination mower and trimmer.

2. Description of the Prior Art

Lawn mowers of the zero-turn radius (ZTR) type are widely used for mowing lawns of large areas. Examples are parks, golf courses, cemeteries and estates. The ZTR mowers are particularly effective because of their ability to move around obstacles on the lawn. Because of the nature of the blades and decks of ZTR mowers, they are unable to move close enough to an object to trim the lawn around it. Therefore, where trimming is desired, and that is usually the case, a separate trimming machine must be used. It can be either a portable one carried by the lawn keeper or it can be one mounted on wheels and either self-propelled, or pushed by the lawn keeper.

Certainly trimmer attachments have been invented by others for mounting on mower decks and an example is shown in U.S. Pat. No. 5,065,566 issued Nov. 19, 1991 to Gates and which discloses a flexible line trimmer attachment for a tractor-driven mower deck. It is a relatively large attachment intended for either original equipment or as an attachment to connect with an existing mower deck and use the power system of the tractor for the mowing deck. It uses a boom which may be lifted out of the way by power assist, when not in use. So does an arrangement mounted on a skid loader type vehicle as shown in U.S. Pat. No. 6,056,067 to Brown. A walk-behind string/mower and trimmer is shown in U.S. Pat. No. 4,703,613, and a walk-behind mower with a string trimmer attachment is shown in U.S Pat. No. 5,159,803. A bracket mountable to a garden tractor for supporting a normally hand-carried string trimmer is disclosed in U.S. Pat. No. 5,303,532. A U.S. Pat. No. 5,367,862 discloses a saucer-like disc with a convex bottom hub on a string trimmer head. A three hub trimmer assembly to be towed behind a lawn tractor or mower is disclosed in U.S. Pat. No. 5,471,824. A walk-behind power mower, with rotor-mounted cutting filaments or strings instead of a blade, is shown in U.S. Pat. No. 5,970,693.

While the foregoing references deal with the subjects of mowing and/or trimming grass, they are not useful with a ZTR mower, considering the ability of such mowers to turn in a spot and run in reverse as well as in a forward direction. The present invention is addressed to the need for convenient and quick mowing and trimming with a ZTR machine and without the need for the hydraulic system of the mower to support the trimming function.

SUMMARY OF THE INVENTION

According to the illustrated and preferred embodiment of the present invention, a hydraulic pump is mounted to the mower deck of a powered lawn mowing machine and, through a coupling controllable from the machine operator's location, is coupled to a mowing cutter driver on the deck to receive power when the cutter is operating. A trimmer is mounted to a bracket mounted to the mowing machine and has a hydraulic motor coupled to it to drive the trimmer. Hydraulic oil storage may be in a front-mounted tank serving both for oil storage, as a mounting bracket for an adjustable trimmer-mounting arm, and as a front bumper for the machine. Hydraulic power is supplied from the pump to the trimmer motor when the controllable coupling is engaged by the machine operator.

BRIEF DESCRIPTION OF THE DRAWINGS

FIGS. 10A, 10B, 10C are the front, top, and end view, respectively of the hydraulic pump mounting bracket.

FIG. 13 is a view of the flotation cup drive shaft, flotation cup, and trimming cord.

FIG. 15 is an exploded view of the trimmer arm and trimmer head assembly.

FIGS. 17A and 17B are front views of the trimmer, showing flotation of the trimmer arm.

FIGS. 19A and 19B are views of the hydraulic motor mounting bracket.

DESCRIPTION OF THE PREFERRED EMBODIMENT

Figure 1:
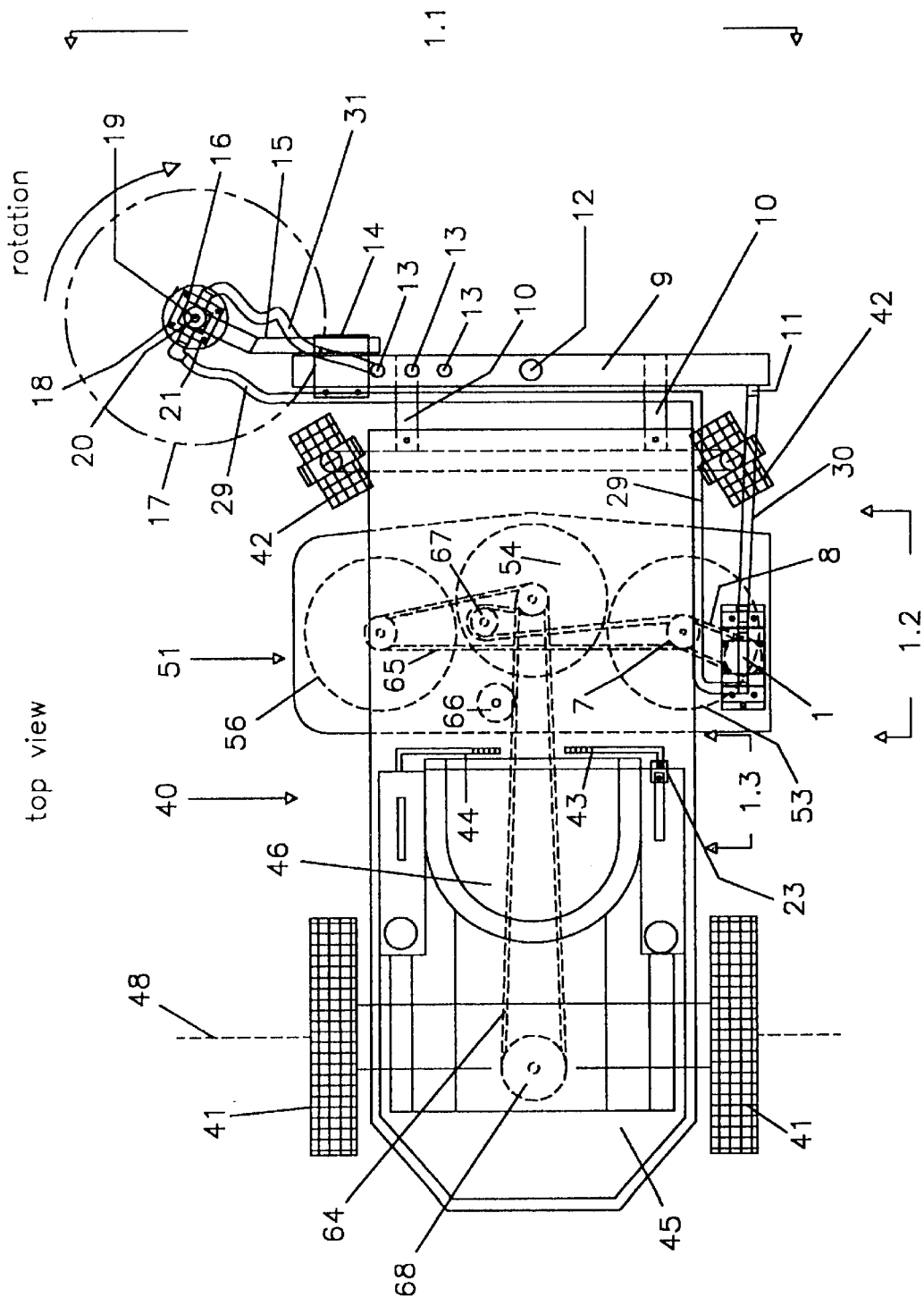
FIG. 1 is a top view of zero-turn radius mower, showing the front bumper/oil reserve tank, trimmer arm, on/off switch, and hydraulic motor.
Figure 2:
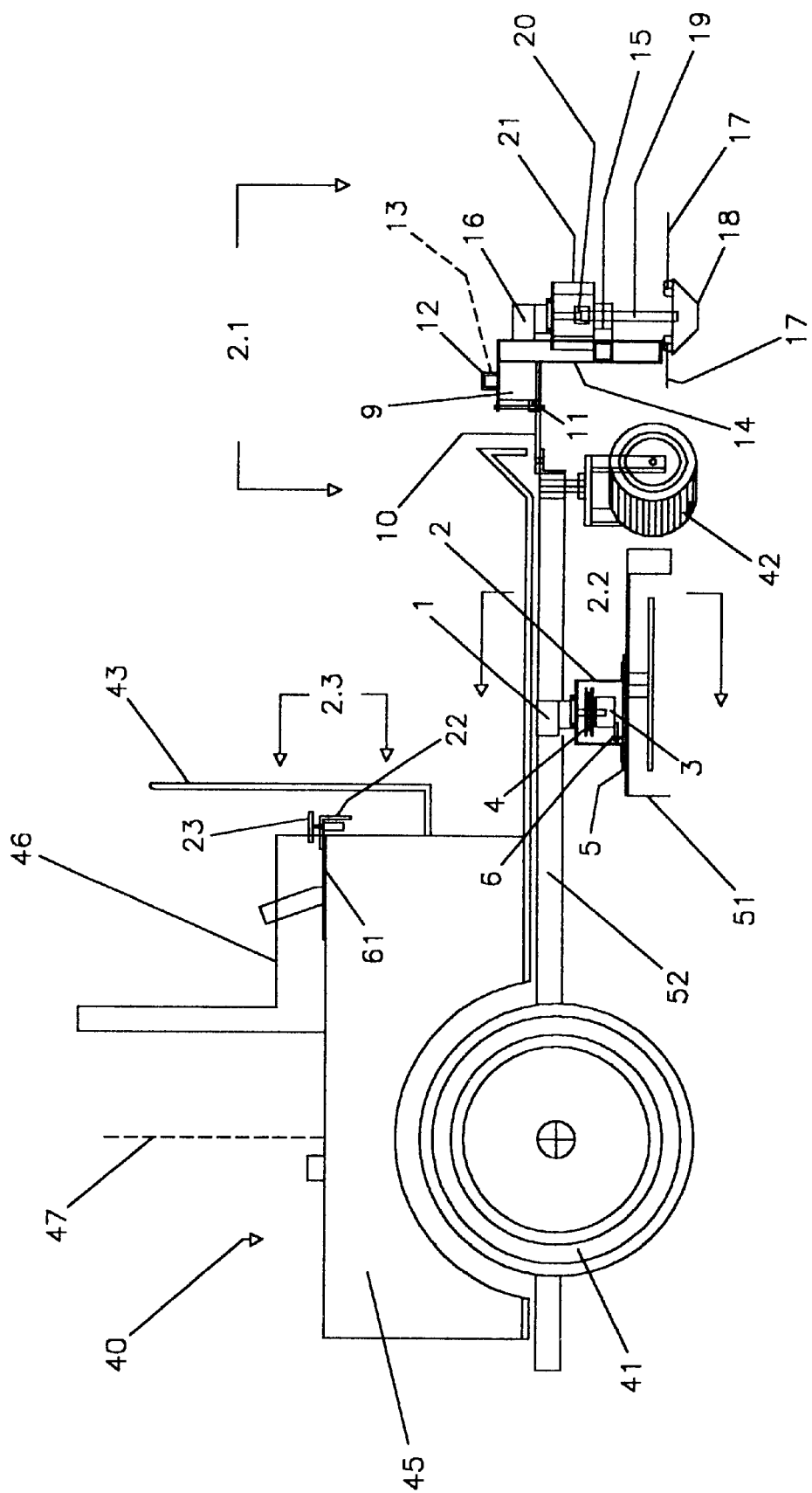
FIG. 2 is a side view of the zero-turn radius mower, showing the front bumper/oil reserve tank, trimmer arm, on/off switch, and hydraulic motor.
Figure 3:
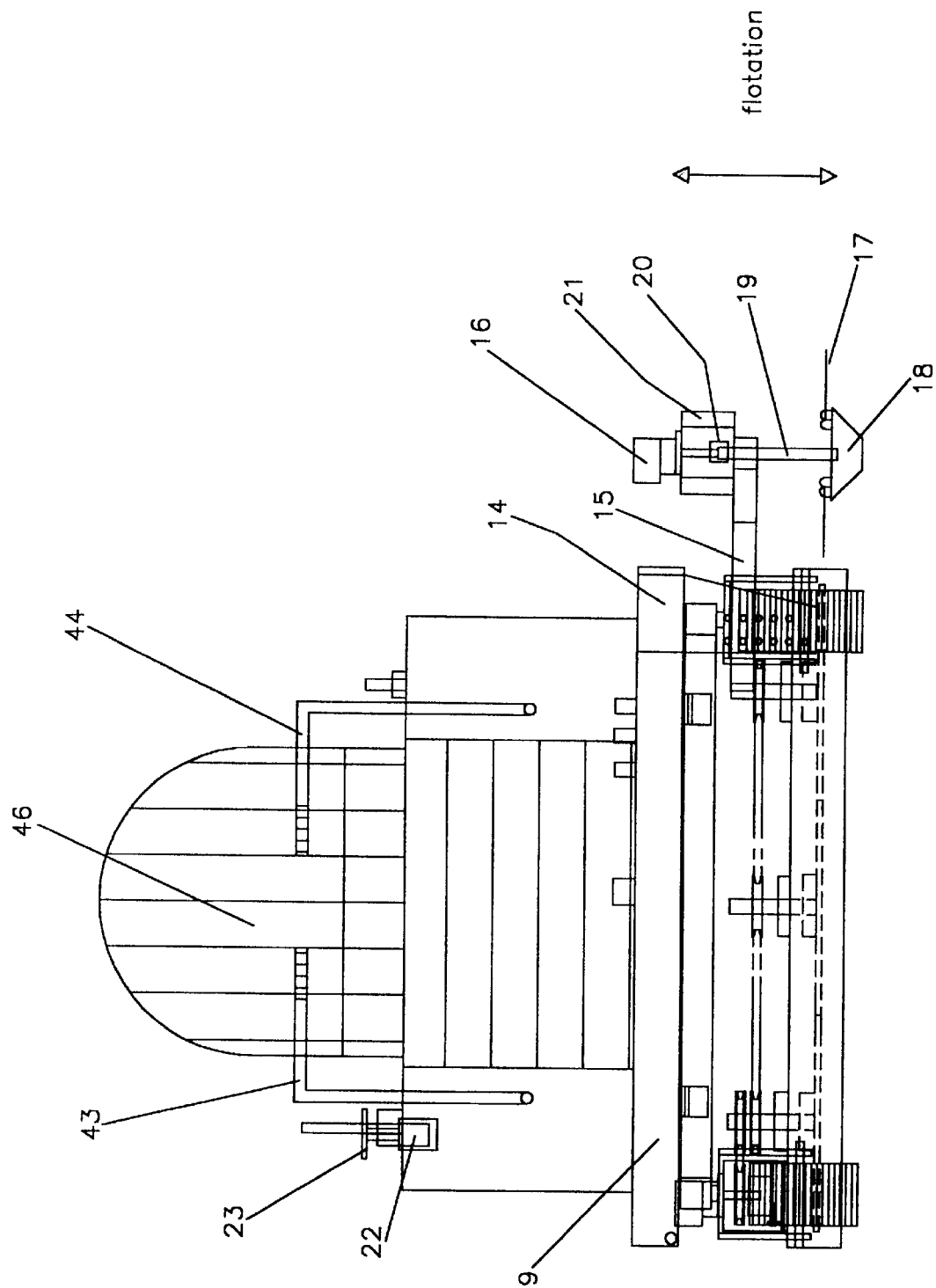
FIG. 3 is a front view of the zero-turn radius mower, showing front bumper/oil reserve tank, trimmer arm on/off switch, and hydraulic motor.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A zero turning radius mower 40 has a pair of driving wheels 41 near the rear, and a pair of swiveling caster wheels 42 at the front. The power is provided by a machine driving motor which is usually a gasoline or diesel engine mounted near the rear of the machine under housing 45, with a transmission operable by the control handles 43 and 44 mounted immediately in front of the operators seat 46. The handles are usable by the operator to control the direction of the two rear wheels, independently of each other, making it possible for the machine to be turned about a vertical axis 47 intersecting a horizontal line or axis 48 through the center of the wheels 41. Therefore, such have received a type of designation as zero turning radius (ZTR). Various brands of such machines are commercially available and are sold under brand names such as Dixie Chopper, Dixon, Toro, Bunton, and Snapper.

In the illustrated machine, a mower deck 51 is mounted by suitable and conventional means to the machine frame 52. The deck covers a set of three rotary mower blades 53, 54 and 56 mounted to shafts mounted in the deck and receiving sheaves connected to the shafts above the mower deck. This set of sheaves is driven by the machine engine, usually by a belt 64 from the engine shaft sheave 68 to a sheave on the shaft for cutter 54, and belt 65 from another sheave on that shaft to sheaves on the shafts of the other two cutters 53 and 56. Sheave 66 is movable by the operator to tighten belt 64 to run the mower blades. Spring loaded sheave 67 maintains desired tension in belt 65. The components described to this point are conventional, and the same or a very similar organization can be found in several brands of commercially available ZTR machines.

Figure 4:
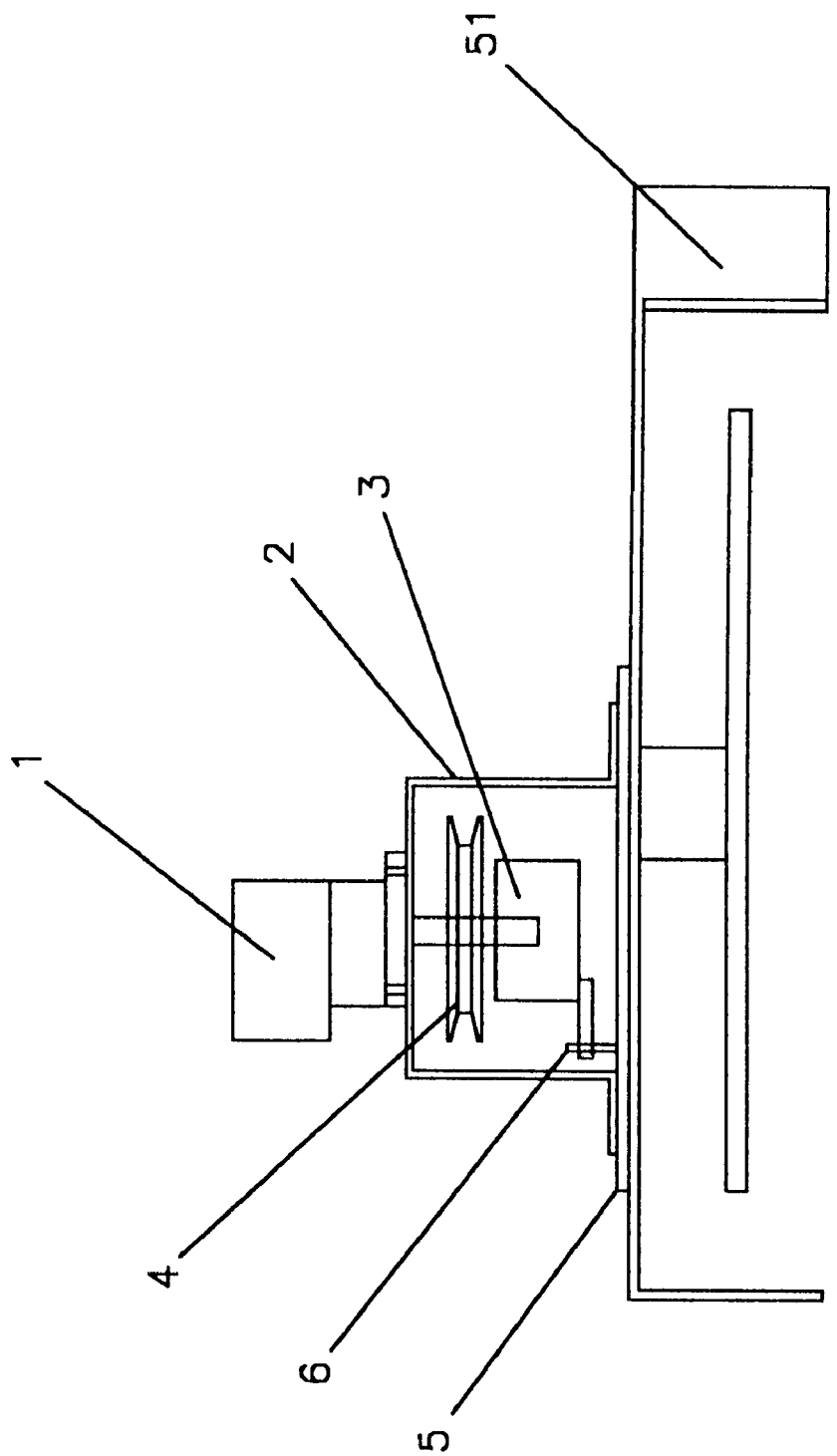
FIG. 4 is a fragmentary side view from line 1.2 in FIG. 1 showing the mower deck with a hydraulic pump.
Figure 5:
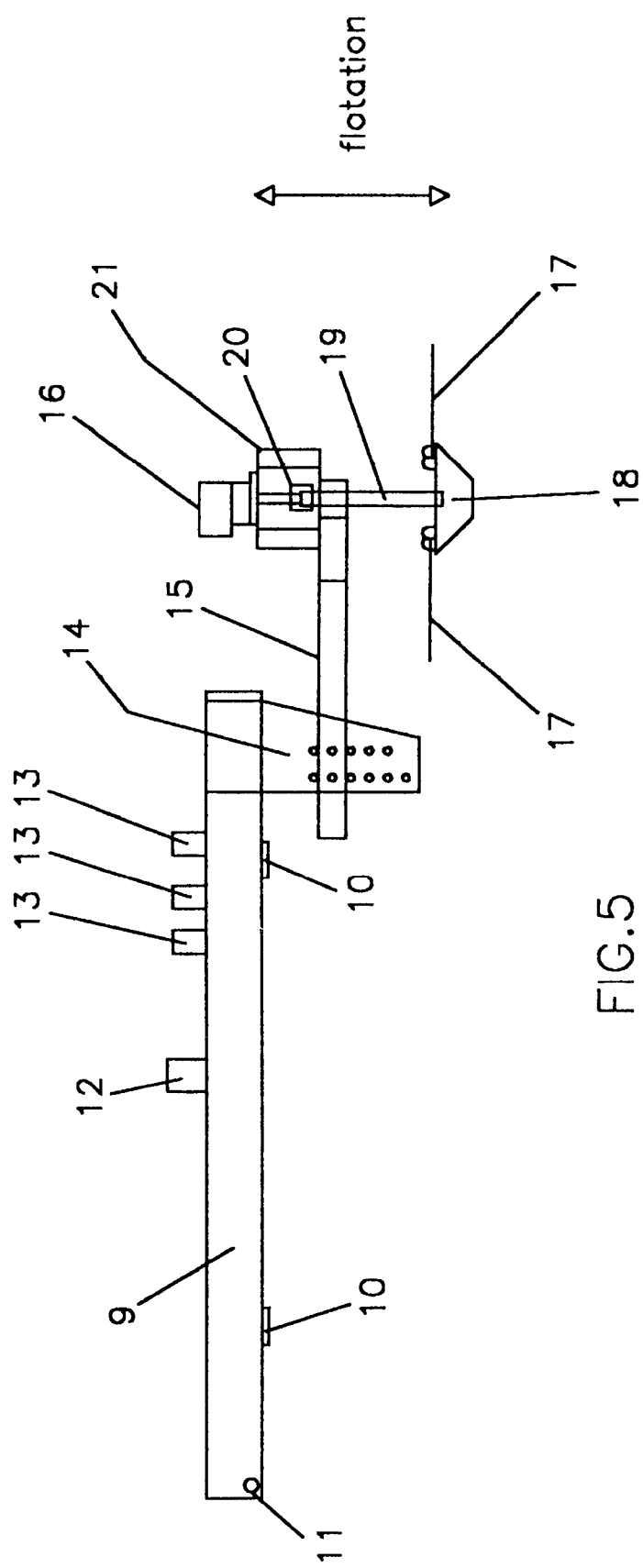
FIG. 5 is a fragmentary front view from line 1.1 in FIG. 1 showing the tank/bumper, trimmer arm mounting bracket, trimmer arm and hydraulic motor.
Figure 6:
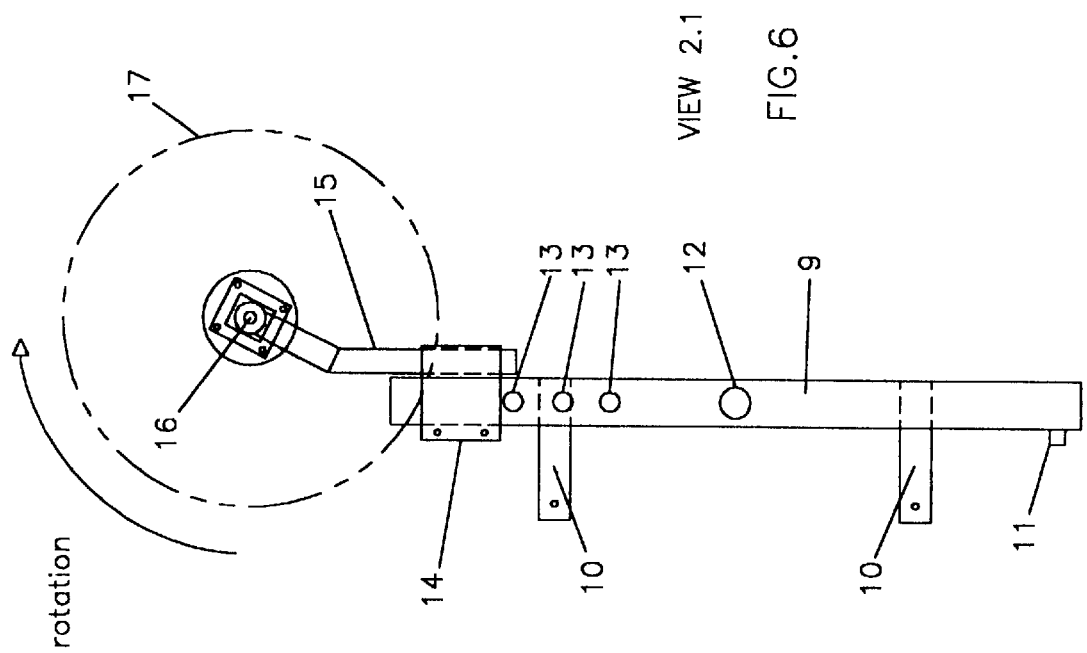
FIG. 6 is a top view of the components viewed from line 2.1 in FIG. 2 and shown in FIG. 5, namely the tank/bumper, trimmer arm mounting bracket, trimmer arm and hydraulic motor.

According to the illustrated embodiment of the present invention, a hydraulic pump 1 is mounted to a bracket 2 (FIGS. 10A, 10B and 10C) which, in turn, is attached to the mower deck 51 (FIG. 4). The pump input shaft 1 S (FIG. 16) projects down through the hole 2H (FIG. 10B) in the top of bracket 2 to which the pump is bolted by four bolts through the pump mounting flange and the four bolt holes in the top of the bracket 2.

Figure 16:
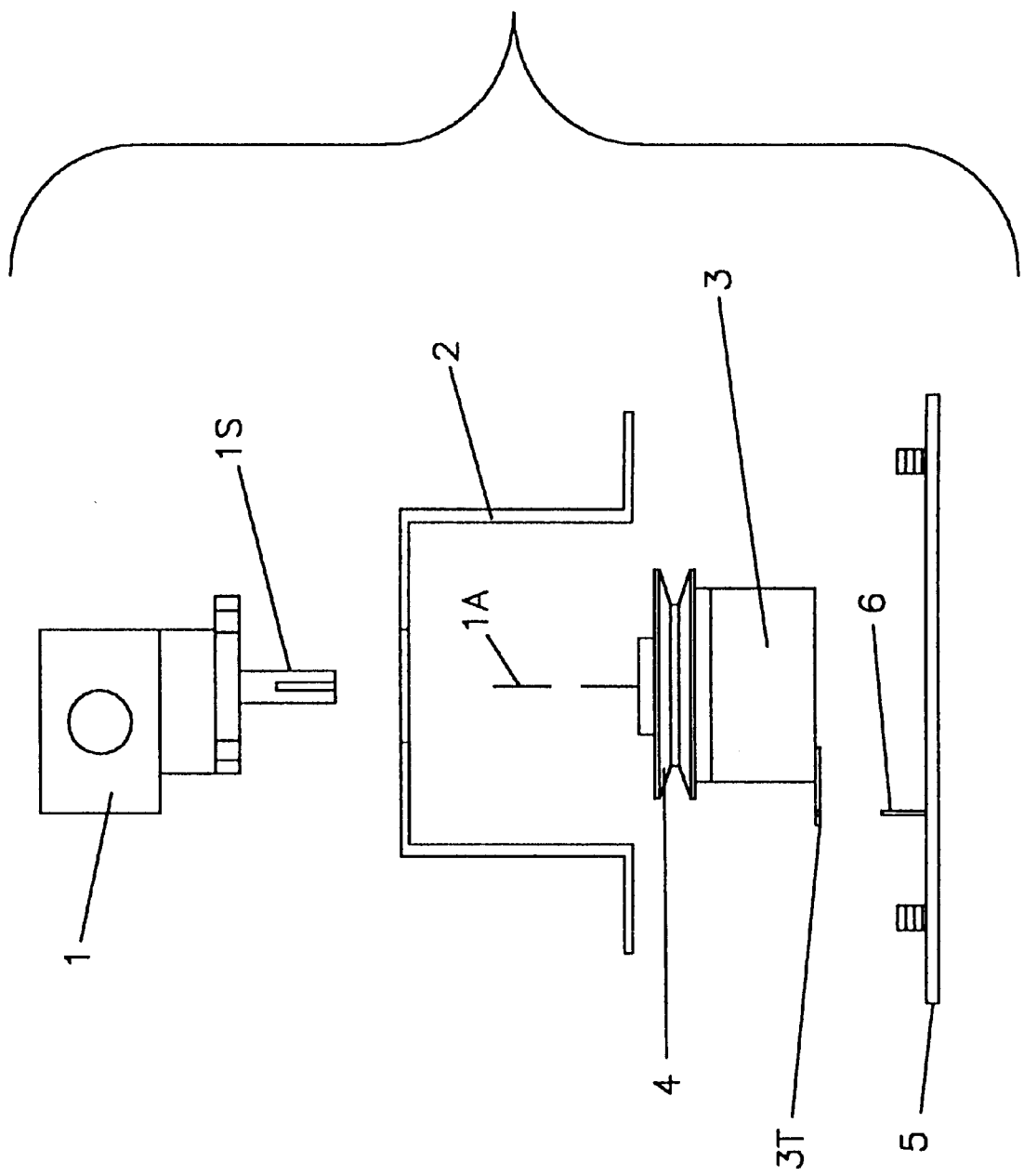
FIG. 16 is an exploded view of the hydraulic pump and mounting bracket.
Figure 18B:
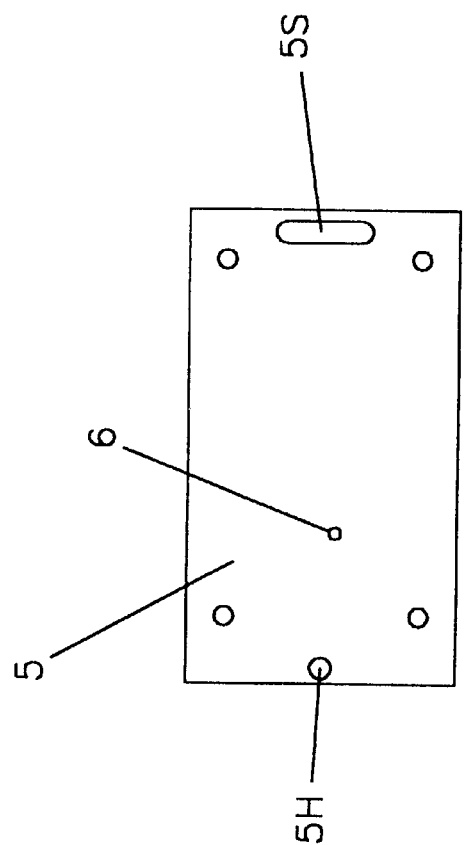
FIGS. 18A and 18B are views of the hydraulic mounting bracket face plate.
Figure 18A:
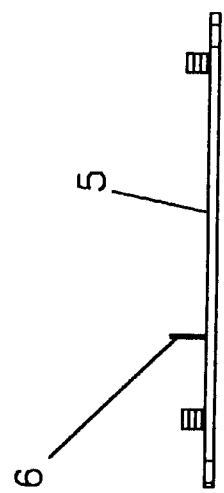

An electric clutch 3 is received between the hydraulic pump mounting bracket 2 and the bracket face plate 5 (FIGS. 16, 18A and 18B). The clutch housing 3 has a tab 3T with an aperture therein receiving a pin 6 fixed to the face plate 5 and projecting up from it, to prevent the clutch housing from rotating. The clutch has independently rotatable internal components, all rotatable on a common axis centered on the pump shaft axis 1A. One of these internal clutch components is fastened with a set screw to the pump shaft 1S for rotation on the pump shaft axis 1A when the clutch is engaged. Sheave 4 is fastened to another of said clutch components and is freely rotatable relative to the electric clutch 3, but is engagable by the clutch, when the clutch is energized.

Figure 7:
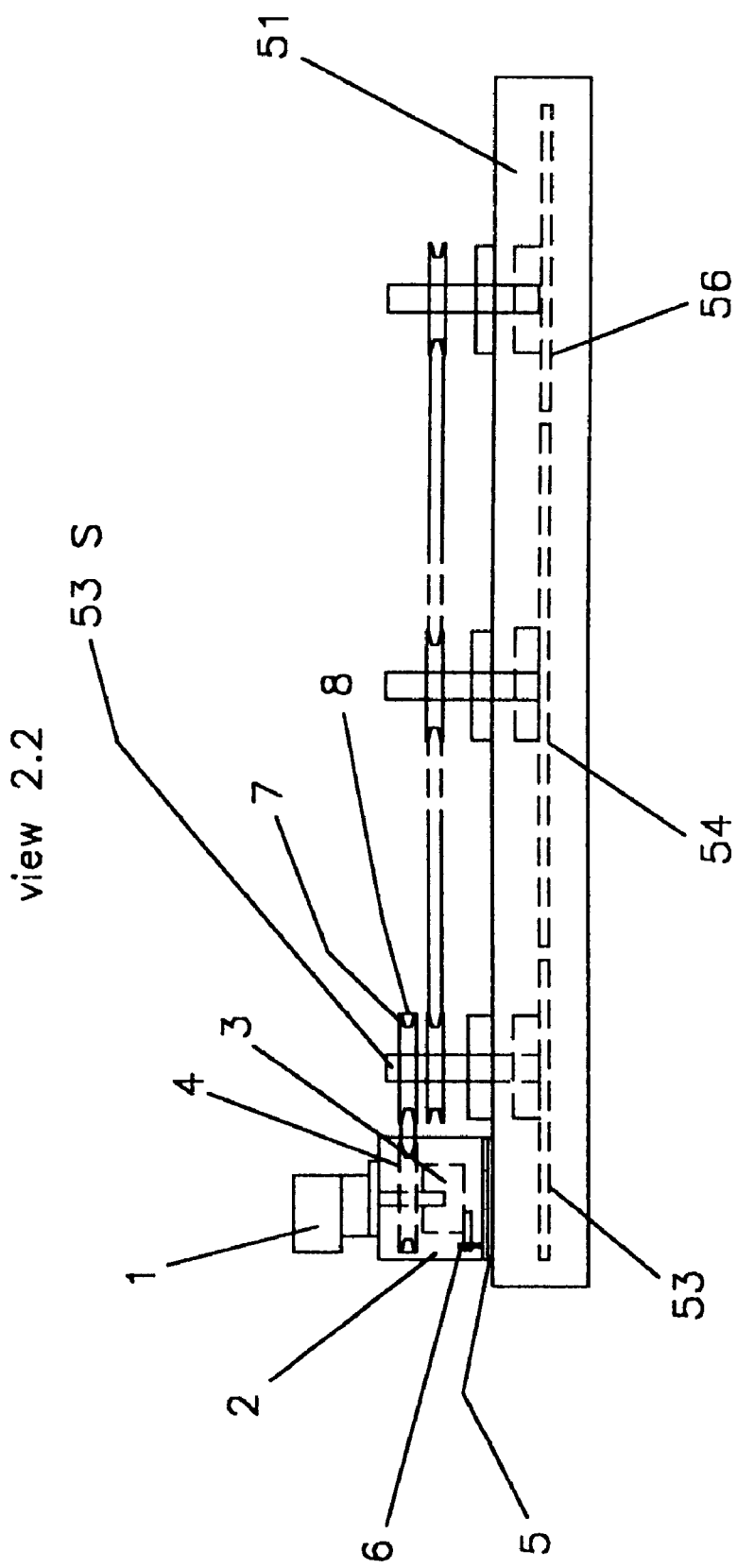
FIG. 7 is a cross-section at line 2.2 in FIG. 2 and viewed in the direction of the arrows and showing the mower deck with hydraulic pump mounting.
Figure 8:
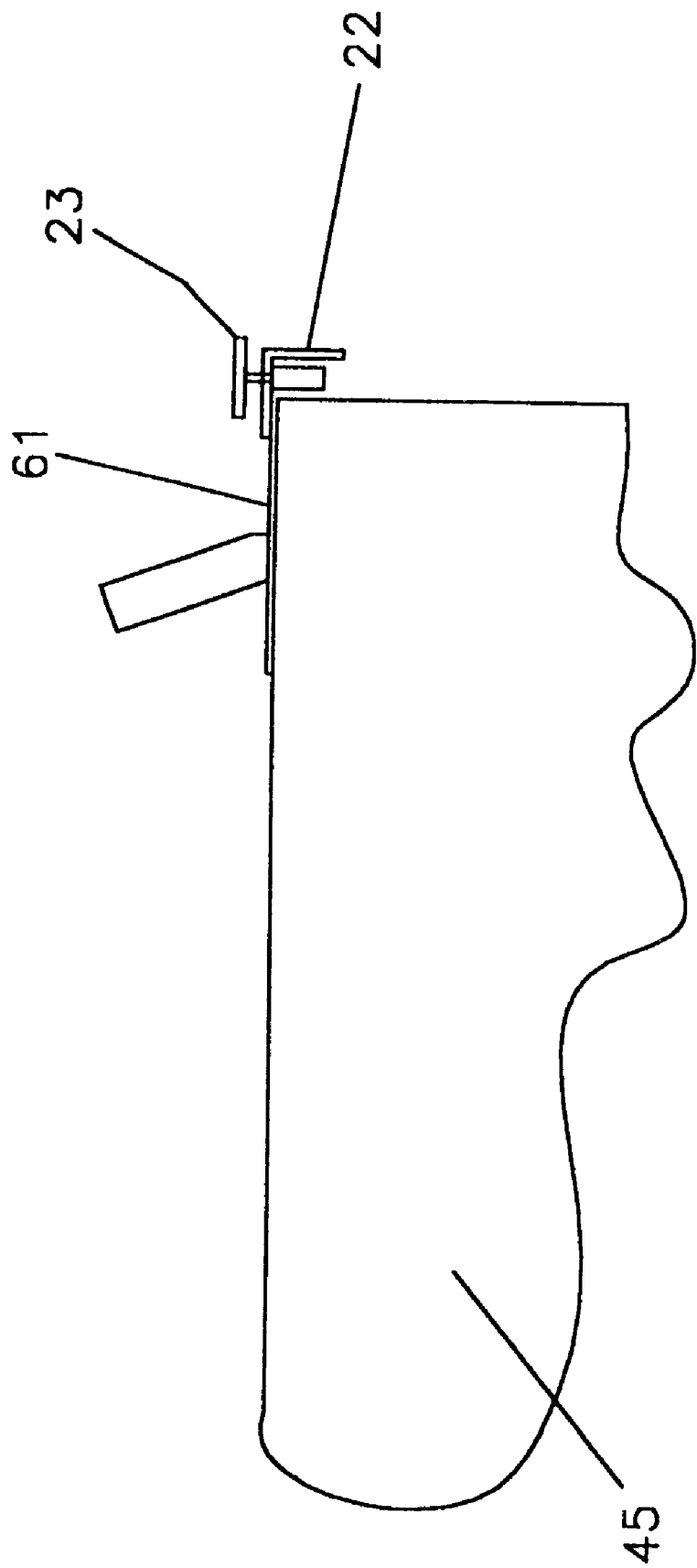
FIG. 8 is a fragmentary section viewed from line 1.3 in FIG. 1 showing the mounting of the trimmer on/off switch and switch bracket.
Figure 9:
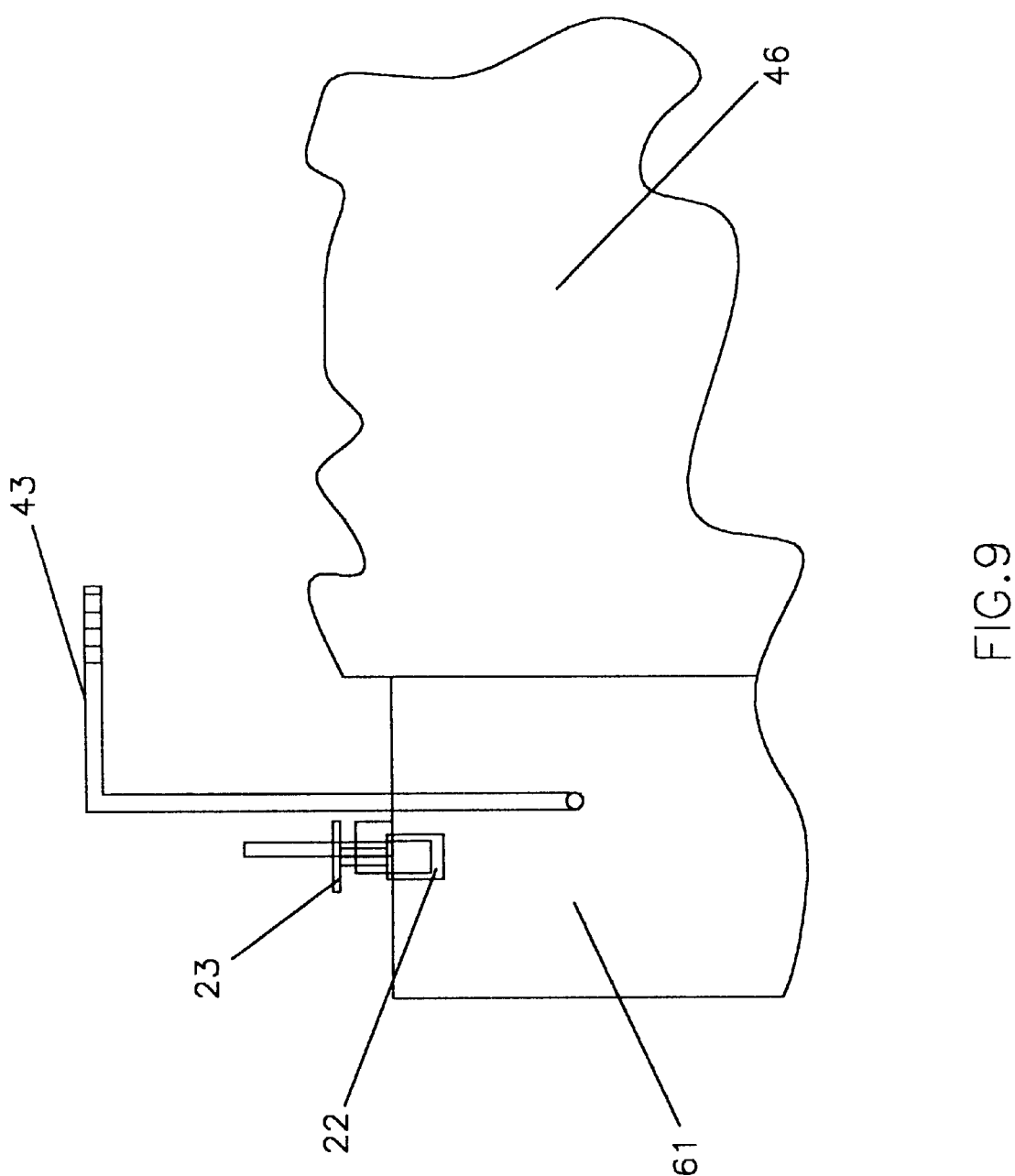
FIG. 9 is a front view of the mounting of the on/off switch and switch bracket of FIG. 8.
Figure 11C:
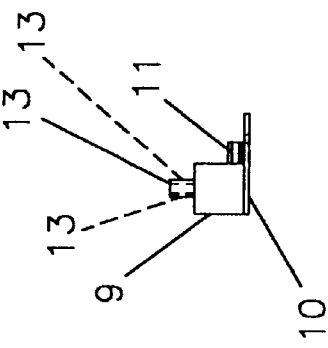
FIGS. 11A, 11B, 11C are the front, top and end views, respectively, of the front bumper/oil reserve tank.
Figure 11B:
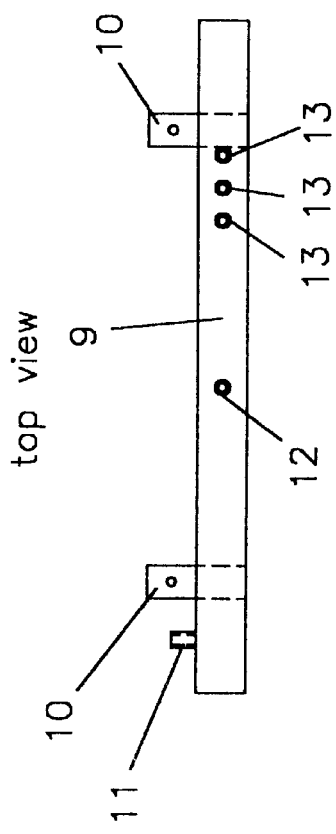
Figure 11A:
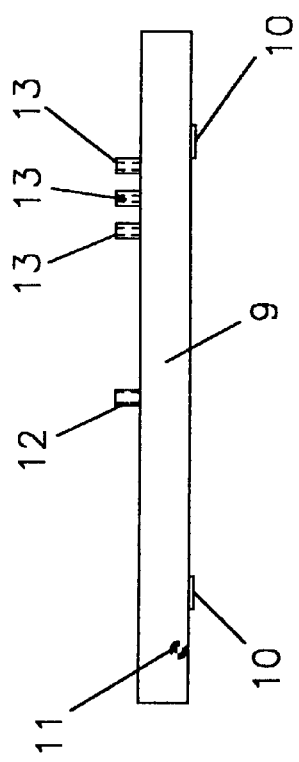
Figure 12B:
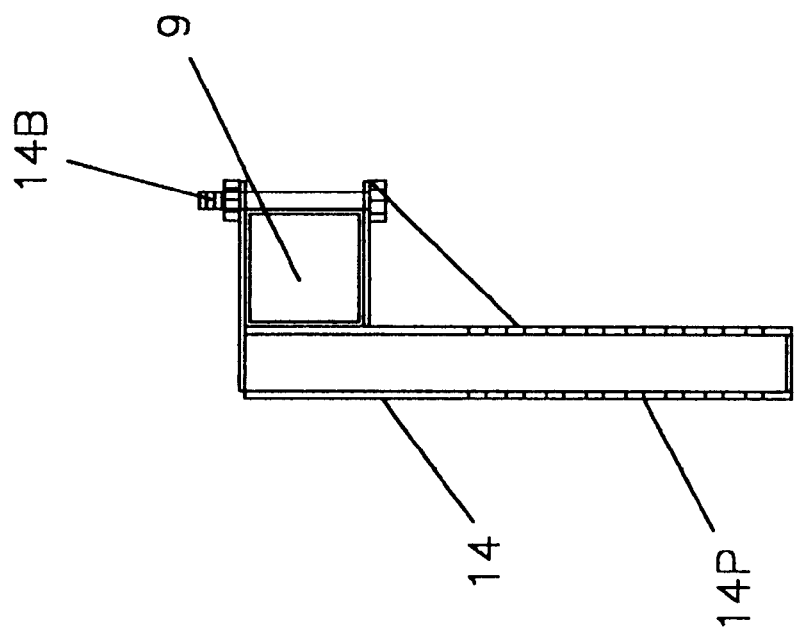
FIGS. 12A and 12B are the front and side views, respectively, of the trimmer arm mounting bracket and showing it clamped to the oil tank in FIG. 12B.
Figure 12A:
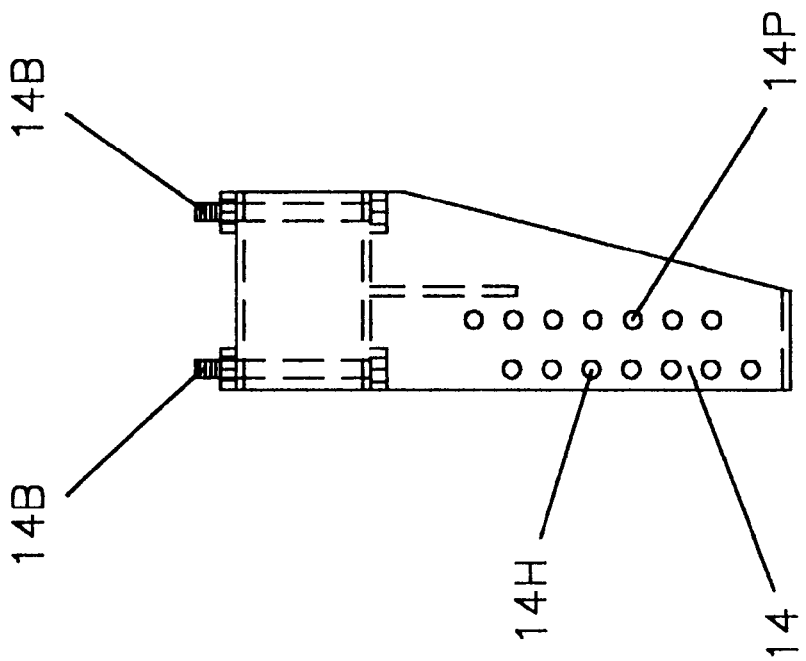
Figure 14B:
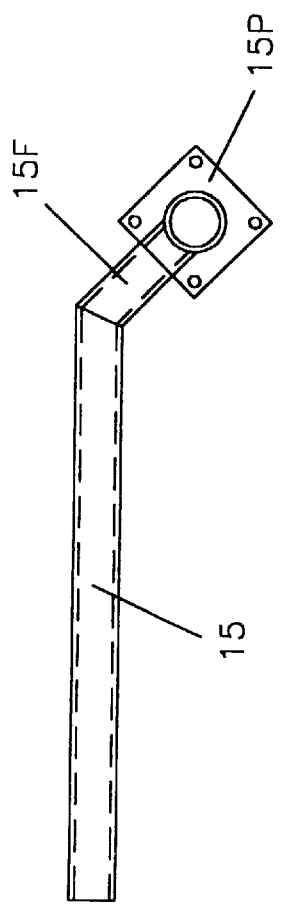
FIGS. 14A and 14B are the front and top views, respectively, of the trimmer arm anchor eyelets.
Figure 14A:
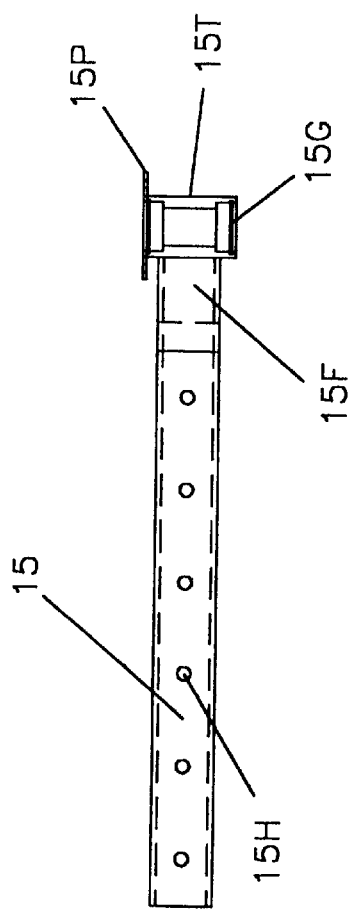

Referring particularly to FIG. 7, a sheave 7 is splined or otherwise affixed to the mower blade shaft 53 S near its upper end. A V-belt 8 runs on the sheaves 4 and 7 providing power from the mower deck to the sheave 4 whenever the mower blades are running. Therefore, whenever the mower blades are powered, and the electric clutch 3 is energized, the hydraulic pump 1 is operating. While pump coupling and uncoupling arrangements other than an electric clutch (a bowden wire operated mechanical clutch or transmission, for example) might be used, I think the electric clutch is preferred for its simplicity in application.

Referring in particular to FIGS. 1, 5, 11A, 11B, 11C, 12A, 12B, 14A and 14B, an elongate tank of square cross-section 9 is mounted by brackets 10 bolted to the front of the machine frame 52. It has a fill port 12 at the top center and a suction port 11 at one end connected by tubing 30 to the intake port of the hydraulic pump 1. This tank, being very sturdy, can serve not only as a hydraulic oil tank, but also as a front bumper for the machine. A trimmer arm mounting bracket 14 is clamped to tank 9 by a couple of bolts 14B near the end opposite the suction port 11. It has a plurality of holes 14H and 14P vertically spaced in two horizontally spaced columns. Further referring to FIGS. 14A and 14B, along with FIGS. 12A and 12B and FIGS. 17A and 17B, a trimmer arm 15 of generally box or square-section tubing construction, is provided with a plurality of holes 15H at spaced locations along its length. The horizontal spacing between these holes is preferably the same as the horizontal spacing between the two columns 14H and 14P in the trimmer arm mounting bracket. The trimmer arm is pivotally mounted to the bracket 14 by placing a pin or bolt (serving as a pivot pin) 27 through one of the holes in the arm and one of the holes 14P in the bracket. A pin or bolt (serving as a stop) 28 is employed in one of the holes 14H at the next level above the pin 27 to prevent the arm from pivoting downward from a level position such as shown in FIG. 17A. However, since there is no pin in any of the holes 14H below the level of the pin 28, the arm can pivot upward as shown in FIG. 17B.

The trimmer assembly components according to the illustrated embodiment of the present invention are best shown in the exploded view of FIG. 15. A bearing housing 15B is welded to the distal end of the forwardly extending portion 15F of the trimmer arm. A rectangular mounting pad 15P is welded atop housing 15B and has four holes in it to receive and secure bolts to fasten the hydraulic motor mounting bracket 21 to the pad 15P. Housing 15B has bearing recesses in the top and bottom ends thereof. Bearings 26L and 26U are received in the bearing recesses. A bearing retaining ring 25L is received under the bearing 26L and retained in a groove 15G (FIG. 14A) in the housing 15B immediately under the bearing recess to retain the lower bearing 26 in that groove. A trimmer drive shaft 19 has an upper circular groove 19U and a lower circular groove 19L. Shaft 19 has a flotation cup 18 fixed to its bottom end portion, and string trimmer filaments 17 are hooked to the top of the cup in downwardly opening loops 18L fixed in the top surface of the cup 18.

The shaft 19 is installed upwardly through the lower shaft retaining ring 24L, bearing retaining ring 25L, bearing 26L, the bore of the housing 15B, the upper bearing 26U, upper bearing retaining ring 25U received in the groove in the upper end of housing 15B, and through the upper shaft retaining ring 24U. Retaining ring 24L is snapped into the groove 19L in shaft 19, and the upper retaining ring 24U is snapped into the groove 19U in the shaft 19. Then the shaft coupling members 20 are assembled on the shaft, motor mounting bracket 21 is put in place on the pad 15P and hydraulic motor 16 shaft 16S is introduced in coupling 20, whereby the shaft 19 and shaft 16S are coupled.

Then the motor mounting flange 16F can be bolted to the top 21T of bracket 21.

Referring again to FIG. 1 a hydraulic pressure line 29 is provided from pump 1 to the hydraulic motor 16. A return line 31 from motor 16 is connected to one of the three inlet fittings 13 on tank 9, depending upon which is most convenient considering which of the six holes 15H of the trimmer arm 15 is pinned to the bracket 14. It should be understood that the portions of lines 29 and 31 adjacent the motor 21 are preferably flexible in order to accommodate various locations of the motor 16 relative to the end of the tank 9 as determined by which of the holes in the trimmer arm are used to mount it to the trimmer arm mounting bracket. The unused two of the holes 13 are provided with removable plugs.

Referring now to FIGS. 1–3, 8 and 9, a switch 23 is mounted on bracket 22 which is affixed to the seat mounting frame 61 in front of the engine cover 45. The switch 23 is a push/pull, on/off switch and located adjacent the steering handle 43 to be in a convenient location. This switch is connected to the electric clutch 3 to turn it on in order to operate the string trimmer or turn it off when string trimmer operation is not needed. As mentioned above, the string trimmer can float up from a level position shown in FIG. 17A to a higher position shown in FIG. 17B. If it is desired to have the trimmer able to float down from level, it is only necessary to provide pins 27 and 28 in holes selected to provide the range of flotation up and down relative to the pivot pin 27 that the operator desires. The fact that the bottom of the flotation cup 18 is somewhat rounded and convex as shown, helps with the flotation action by engaging the ground surface to prevent the spinning filaments as their ends move around the outboard portion of their path of rotation, from gouging the lawn. The outboard and forward location of the trimmer enables the trimmer cutter to cut a swath wide enough to be slightly overlapped by the swath cut by mower blade 56 as the machine moves forward along a path of travel, but not interfere with the front wheel of the mower.

An example of the hydraulic pump 1 is model number 10565 manufactured by Haldex of Burnsville, Minn. This same product can be used for the hydraulic motor 16 by simply reversing the lines to it. An example of the electric clutch 3 is the brand CRP model number 2-11-3161-00JCA manufactured by Rexnord of Milwaukee, Wis. An example of the electric switch is model 35-306 by Serv-A-Lite of East Moline, Ill. An example of the shaft coupling 20 is model Lovejoy L-070 by Rexnord of Milwaukee, Wis. Products of various other manufacturers may be used as well.

One of the significant advantages of the present invention is that it adapts a zero turning radius mowing machine for simultaneous trimming and without modifying the mowing machine itself. It is a matter of simply attaching components which are easily fastened to the mower and which, themselves, can be off-the-shelf or can be easily constructed and assembled components. All of this can be done relatively easily at minimal expense. Moreover, the invention lends itself with extremely minor modifications, to mounting to any of a variety of brands and models of ZTR mowing machines.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. The combination comprising:
a mowing machine having a front and a rear and sides, an operator's seat, a driving motor to drive the machine along a path of travel, and the machine having power transmitting components coupling the motor to at least one rotary mower cutter drive shaft;

an oil reserve tank;

bumper mounting brackets connected to the mowing machine and to said tank and supporting the tank at the front of said machine;

a trimmer arm mounting bracket connected to said tank adjacent an end of the tank and projecting downward from said tank;

a trimmer arm having a proximal end and a distal end;

a trimmer mounted to the arm and including a rotor with at least one cutter attached to said rotor;

a pivot mounting a portion of the arm adjacent the proximal end of the arm to the arm mounting bracket;

the distal end of the arm being located laterally outward from the machine path of travel; and the pivot being oriented to enable the distal end of the arm to move up and down as the mowing machine moves along the ground; and the trimmer being located on the arm to move up and down as the distal end of the arm moves up and down.

2. The combination of claim 1 and further comprising:
a flotation member attached to the bottom of the rotor and operable to lift the rotor and thereby the cutter over rises in the ground for floating the trimmer as the machine moves along the ground.

3. The combination of claim 2 and further comprising:
a stop on the mounting bracket adjacent the pivot and engageable by the arm to limit downward travel of the trimmer.

4. The combination of claim 1 and further comprising:
a hydraulic pump coupled to said rotary mower cutter drive shaft to be driven by the driving motor;

a hydraulic motor mounted on the trimmer arm and coupled to said rotor to drive the rotor; and a hydraulic fluid line coupling said pump to said hydraulic motor and transferring power hydraulically from the pump to the hydraulic motor to drive the trimmer cutter.

5. The combination of claim 4 and further comprising:
a coupling and de-coupling device in the coupling of the drive shaft to the pump and operable to selectively transfer power from the drive shaft to the pump.

6. The combination of claim 5 and further comprising:
a control device located adjacent the operator's seat and coupled to the coupling and de-coupling device and operable by the operator when in the seat to selectively transfer power from the drive shaft to the pump.

7. The combination of claim 5 and wherein:
said coupling and de-coupling device is an electric clutch.

8. The combination of claim 4 and wherein:
the machine has a mower deck between the front and rear;

the pump is attached to the mower deck; and the pump has a shaft coupled to said drive shaft.

9. The combination of claim 8 and further comprising:
a first pulley connected to said drive shaft;

an electric clutch;

a second pulley connected to said electric clutch;

a belt mounted on said pulleys;

the clutch normally de-coupling the pump from the rotary mower cutter drive shaft but operable, when energized, to couple the drive shaft to said pump to power the pump when the mower cutter is powered.

10. The combination of claim 9 and wherein:
the machine is a zero turning radius mowing machine.

11. The combination comprising:
a mowing machine having a front and a rear and sides, an operator's seat, a driving motor to drive the machine along a path of travel, and the machine having power transmitting components coupling the motor to at least one rotary mower cutter drive shaft;
a trimmer mounted to the machine and including a rotor with at least one trimmer cutter attached to said rotor;
a mower deck on the machine between the front and rear;
a hydraulic pump attached to the mower deck;
said hydraulic pump being coupled to said rotary mower cutter drive shaft to be driven by the driving motor;
a hydraulic motor coupled to said rotor to drive the rotor; and
a hydraulic fluid conveying line hydraulically coupling said pump to said hydraulic motor and transferring power hydraulically from the pump to the hydraulic motor to drive the trimmer cutter.

12. The combination of claim 11 and wherein:
the pump has a shaft coupled to said mower cutter drive shaft; and
said trimmer is located laterally outward from the machine path of travel.

13. The combination of claim 11 and further comprising:
a flotation member attached to the bottom of the rotor and operable to lift the rotor and thereby the cutter over rises in the ground for floating the trimmer as the machine moves along the ground.

14. The combination of claim 11 and further comprising:
a coupling and de-coupling device in the coupling of the mower cutter drive shaft to the pump and operable to selectively transfer power from the drive shaft to the pump.

15. The combination of claim 14 and further comprising:
a control device located adjacent the operator's seat and coupled to the coupling and de-coupling device and operable by the operator when in the seat to selectively transfer power from the drive shaft to the pump.

16. The combination of claim 15 and wherein:
said coupling and de-coupling device is an electric clutch.

17. The combination of claim 16 and wherein:
the control device is an electric switch.

18. The combination of claim 16 and further comprising:
a first pulley connected to said drive shaft;
a second pulley connected to said electric clutch;
a belt mounted on said pulleys;
said clutch normally de-coupling the pump from the rotary mower cutter drive shaft but operable, when energized, to couple said drive shaft to said pump to power the pump when the mower cutter is powered.

19. The combination of claim 11 and wherein:
the trimmer cutter rotates when driven and is located to cut a swath along the path of travel of the machine; and
the mower deck has a rotary mower cutter located below one side of the machine to cut a swath partially overlapping the swath of the trimmer cutter along the path of travel.

20. The combination of claim 19 and wherein:
the machine is a zero turning radius mowing machine.

21. The combination comprising:
a mowing machine having a front and a rear and sides, a machine operator's seat, a power source, swiveling caster wheels near the front, driving wheels near the rear to drive the machine along paths of travel determinable by a machine operator and to selectively turn the machine about a vertical axis intersecting a horizontal line through the centers of said driving wheels, a mower deck located behind the caster wheels and in front of the driving wheels; a mower cutter under the deck and operable, when powered, to cut a mower swath along a forward path of travel of the machine determined by the machine operator, and power transmitting components coupled to said power source and to said mower cutter to drive said mower cutter;
an oil reserve tank;
at least one mounting bracket connected to the mowing machine and to said tank and supporting the tank at the front of said machine;
a trimmer arm mounting bracket connected to said tank adjacent an end of the tank and projecting downward from said tank;
a trimmer arm having a proximal end and a distal end;
a trimmer mounted to the arm and including a rotor and having at least one trimmer cutter attached to said rotor and operable, when powered, to cut a trimmer swath as the machine is driven along said forward path;
a pivot mounting a portion of the arm adjacent the proximal end of the arm to the arm mounting bracket;
the distal end of the arm being located laterally outward from the machine path of travel;
the pivot being oriented to enable the distal end of the arm to move up and down as the mowing machine moves along the ground; the trimmer being located on the arm to move up and down as the distal end of the arm moves up and down, and
said trimmer being located forward of said caster wheels with said rotor outboard of said forward path, thereby positioning the trimmer cutter to cut a trimmer swath along said forward path for partial overlap of the trimmer cutter swath by said mower cutter swath as said machine is driven along said forward path and without manipulation of the trimmer by the machine operator.

22. The combination of claim 21 and further comprising:
a flotation member attached to the bottom of the rotor and operable to lift the rotor and thereby the cutter over rises in the ground for floating the trimmer as the machine moves along the ground.

23. The combination of claim 22 and further comprising:
a stop on the mounting bracket adjacent the pivot and engageable by the arm to limit downward travel of the trimmer.

24. The combination of claim 21 and wherein said power transmitting components are located on said mower deck, the combination further comprising:
a hydraulic pump coupled to said power transmitting components to be driven by the power source;
a hydraulic motor mounted on the trimmer arm and coupled to said rotor to drive the rotor; and
a hydraulic fluid line coupling said pump to said hydraulic motor and transferring power hydraulically from the pump to the hydraulic motor to drive the trimmer cutter.

25. The combination of claim 24 and further comprising:
a coupling and de-coupling device coupling said pump to said power transmitting components and operable to selectively transfer power from said power transmitting components to said pump.

26. The combination of claim 25 and further comprising:
a control device located adjacent the operator's seat and coupled to said coupling and de-coupling device and operable by the operator when in the seat to selectively transfer power from said power transmitting components to said pump.

27. The combination of claim 25 and wherein:
said coupling and de-coupling device is an electric clutch.

28. The combination of claim 24 and wherein:
said mower cutter is a rotary mower cutter having a vertical drive shaft;
said pump is attached to said mower deck; and
said pump has a shaft coupled to said drive shaft.

29. The combination of claim 28 and further comprising:
a first pulley connected to said drive shaft;
an electric clutch;
a second pulley connected to said electric clutch;
a belt mounted on said pulleys;
said clutch normally de-coupling said pump from said rotary mower cutter drive shaft but operable, when electrically energized, to couple said drive shaft to said pump shaft to power said pump when said mower cutter is powered.

30. The combination of claim 29 and wherein:
said pump is mounted on said mower deck.

31. The combination comprising:
a mowing machine having a front and a rear and sides, a machine operator's seat, a power source, front and rear machine support wheels near the front and near the rear, a pair of said wheels being operable to drive the machine along paths of travel determinable by a machine operator and to selectively perform zero turn radius turns of the machine, a mower deck located behind a front one of said wheels and in front of a rear one of said wheels, a mower cutter under the deck and operable, when powered, to cut a mower swath along a forward path of travel of the machine determined by the machine operator, and the machine having power transmitting components coupled to said power source and to said mower cutter to drive said mower cutter;
a trimmer mounted to the machine and including a rotor and at least one trimmer cutter attached to said rotor;
a hydraulic pump mounted on and attached to the mower deck;
said hydraulic pump being coupled to said power transmitting components to be driven by the power source;
a hydraulic motor coupled to said rotor to drive the rotor; and
a hydraulic fluid conveying line hydraulically coupling said pump to said hydraulic motor and transferring power hydraulically from the pump to the hydraulic motor to drive the trimmer cutter.

32. The combination of claim 31 and wherein:
said mower cutter has a drive shaft;
said pump has a shaft coupled to said mower cutter drive shaft; and
said trimmer is located laterally outward from and ahead of the operator determined machine path of travel.

33. The combination of claim 31 and wherein said rotor has a bottom, the combination further comprising:
a flotation member attached to the bottom of said rotor and operable to lift said rotor and thereby said cutter over rises in the ground for floating said trimmer as said machine moves along the ground.

34. The combination of claim 32 and further comprising:
a coupling and de-coupling device coupling said mower cutter drive shaft to said pump shaft and operable to selectively transfer power from said drive shaft to said pump.

35. The combination of claim 34 and further comprising:
a control device located adjacent the operator's seat and coupled to said: coupling and de-coupling device and operable by the operator when in the seat to selectively transfer power from said cutter drive shaft to said pump.

36. The combination of claim 35 and wherein:
said coupling and de-coupling device is an electric clutch.

37. The combination of claim 36 and wherein:
said control device is an electric switch.

38. The combination of claim 36 and further comprising:
a first pulley connected to said drive shaft;
a second pulley connected to said electric clutch;
a belt mounted on said pulleys;
said clutch normally de-coupling the pump from the rotary mower cutter drive shaft but operable, when energized, to couple said drive shaft to said pump to power the pump when the mower cutter is powered.

39. The combination of claim 31 and wherein:
said trimmer cutter rotates when driven and is located to cut a trimmer swath along said forward path of travel of the machine; and
the mower deck has a rotary mower cutter located below one side of the machine to cut a swath partially overlapping the swath of the trimmer cutter along the said forward path of travel.

40. The combination of claim 39 and wherein:
said support wheels comprise at least one swiveling caster wheel near the front; and
said wheels of said pair are near the rear of said machine.

41. The combination comprising:
a mowing machine having a front and a rear and sides, a machine operator's seat, a power source, front wheels near the front, rear wheels near the rear, a pair of said wheels being operable to drive the machine along paths of travel determinable by a machine operator and to selectively perform zero turn radius turns of the machine, a mower deck behind the front wheels and in front of the rear wheels, a mower cutter under the deck and operable, when powered, to cut a mower swath along a forward path of travel of the machine determined by the machine operator, and the machine having power transmitting components coupled to said power source and to said mower cutter to drive said mower cutter;
a trimmer mounted to the machine and including a rotor and at least one trimmer cutter attached to said rotor and operable, when powered, to cut a trimmer swath as the machine is driven along said forward path;
a motor coupled to said rotor to drive the rotor; and
said trimmer being located forward of said front wheels with said rotor outboard of said forward path, thereby positioning the trimmer cutter to cut a trimmer swath along said forward path for partial overlap of the trimmer cutter swath by said mower cutter swath as said machine is driven along said forward path and without manipulation of the trimmer by the machine operator.

42. The combination of claim 41 and wherein:

said front wheels are swivel caster wheels and the said rear wheels comprise the pair for driving the machine.

43. The combination of claim 41 and wherein:

said motor is a hydraulic motor.

44. The combination of claim 43 and further comprising:

a hydraulic pump and a fluid conveying line hydraulically coupling said pump to said hydraulic motor and transferring power hydraulically from the pump to the hydraulic motor to drive the trimmer cutter.

45. The combination of claim 44 and wherein:

said hydraulic pump is mounted on and attached to the mower deck; and said hydraulic pump is coupled to said power transmitting components to be driven by the power source.

46. A trimmer combination for a motor powered mowing machine and comprising:

an elongate hydraulic fluid storage tank having ends;

at least one mounting bracket for mounting at the front of a mowing machine and connected to said tank for supporting the tank at the front of said machine;

a trimmer arm mounting bracket connected to said tank adjacent one of said ends of said tank and projecting downward from said tank;

a trimmer arm having a proximal end and a distal end;

a trimmer mounted to said arm and including a rotor with at least one trimmer cutter attached to said rotor;

a pivot mounting a portion of the arm adjacent the proximal end of the arm, to the arm mounting bracket;

the pivot being oriented to enable the distal end of the arm to move up and down as the mowing machine moves along the ground; and the trimmer being located on the arm to move up and down as the distal end of the arm moves up and down.

47. The combination of claim 46 and further comprising:

a flotation member attached to the bottom of the rotor and operable to lift the rotor and thereby the cutter over rises in the ground for floating the trimmer as the mowing machine moves along the ground.

48. The combination of claim 46 and further comprising:

a stop on the mounting bracket adjacent the pivot and engageable by the arm to limit downward travel of the trimmer.

49. The combination of claim 46 and further comprising:

a hydraulic pump;

a hydraulic motor mounted on the trimmer arm and coupled to said rotor to drive the rotor; and a hydraulic fluid line coupling said pump to said hydraulic motor and transferring power hydraulically from the pump to the hydraulic motor to drive the trimmer cutter.

50. The combination of claim 49 and further comprising:

a coupling and de-coupling device for transmitting power from a power source on the mowing machine to the pump, and operable to selectively transfer power from the power source to the pump.

51. The combination of claim 50 and further comprising:

a control device coupled to the coupling and de-coupling device and operable by a machine operator when driving the mowing machine to selectively transfer power from the power source to the pump.

52. The combination of claim 50 and wherein:

said coupling and de-coupling device is an electric clutch.

53. The combination of claim 49 and wherein:

the pump is adapted to be attached to a mower deck of the mowing machine; and the pump has a power input shaft.

54. The combination of claim 53 and further comprising:

a first pulley connected to said input shaft;

an electric clutch;

a second pulley connected to said electric clutch; and a belt mounted on said pulleys.

55. The combination of claim 46 and further comprising:

a mowing machine having a front and a rear and sides, a machine operator's seat, a power source, front wheels near the front, rear wheels near the rear, a pair of said wheels being operable to drive the machine along paths of travel determinable by a machine operator and to selectively perform zero turn radius turns of the machine, a mower deck behind the front wheels and in front of the rear wheels, a mower cutter under the deck and operable, when powered, to cut a mower swath along a forward path of travel of the machine determined by the machine operator, and the machine having power transmitting components coupled to said power source and to said mower cutter to drive said mower cutter;

said bumper brackets being mounted to the front of the mowing machine;

said trimmer cutter being operable, when powered, to cut a trimmer swath as the machine is driven along said forward path; and said trimmer cutter being located to produce said trimmer swath located for partial overlap by said mower swath as the machine is driven along said forward path and without manipulation of the trimmer by the operator.

56. The combination of claim 49 and further comprising:

a mowing machine having a front and a rear and sides, a machine operator's seat, a power source, front wheels near the front, rear wheels near the rear, a pair of said wheels being operable to drive the machine along paths of travel determinable by a machine operator and to selectively perform zero turn radius turns of the machine, a mower deck behind the front wheels and in front of the rear wheels, a mower cutter under the deck and operable, when powered, to cut a mower swath along a forward path of travel of the machine determined by the machine operator, and the machine having power transmitting components coupled to said power source and to said mower cutter to drive said mower cutter;

said mounting bracket being mounted to the front of said mowing machine; and said hydraulic pump being coupled to said power transmitting components to drive said pump;

said trimmer cutter being operable, when powered, to cut a trimmer swath as the machine is driven along said forward path; and said trimmer cutter being located to produce said trimmer swath located for partial overlap by said mower swath as the machine is driven along said forward path and without manipulation of the trimmer by the operator.

57. The combination of claim 53 and further comprising:

a mowing machine having a front and a rear and sides, a machine operator's seat, a power source, front wheels near the front, rear wheels near the rear, a pair of said wheels being operable to drive the machine along paths of travel determinable by a machine operator and to selectively perform zero turn radius turns of the machine, a mower deck behind the front wheels and in front of the rear wheels, a mower cutter under the deck and operable, when powered, to cut a mower swath along a forward path of travel of the machine determined by the machine operator, and the machine having power transmitting components coupled to said power source and to said mower cutter to drive said mower cutter;

said mounting bracket being mounted at the front of said mowing machine; and said pump being mounted on said mower deck said trimmer cutter being operable, when powered, to cut a trimmer swath as the machine is driven along said forward path; and said trimmer cutter being located to produce said trimmer swath located for partial overlap by said mower swath as the machine is driven along said forward path producing said trimmer swath and said mower swath and without manipulation of the trimmer by the operator.

* * * * *

UNITED STATES PATENT AND TRADEMARK OFFICE
CERTIFICATE OF CORRECTION

PATENT NO. : 6,487,838 B2
DATED : December 3, 2002
INVENTOR(S) : Terry L. Handlin It is certified that error appears in the above-identified patent and that said Letters Patent is hereby corrected as shown below:

Column 10,
Line 8, remove the ":" after "said".

Signed and Sealed this

Eighth Day of April, 2003

JAMES E. ROGAN
*Director of the United States Patent and Trademark Office*